US009727468B2

(12) United States Patent
Sistla et al.

(10) Patent No.: US 9,727,468 B2
(45) Date of Patent: Aug. 8, 2017

(54) RESOLVING MULTI-CORE SHARED CACHE ACCESS CONFLICTS

(75) Inventors: Krishnakanth V. Sistla, Hillsboro, OR (US); Yen-Cheng Liu, Portland, OR (US); George Cai, Lake Oswego, OR (US); Jeffrey D. Gilbert, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 11/045,525

(22) Filed: Jan. 28, 2005

(65) Prior Publication Data

US 2006/0053257 A1 Mar. 9, 2006

Related U.S. Application Data

(63) Continuation-in-part of application No. 10/937,973, filed on Sep. 9, 2004, now abandoned.

(51) Int. Cl.
*G06F 12/084* (2016.01)
*G06F 12/0815* (2016.01)

(52) U.S. Cl.
CPC ........ *G06F 12/084* (2013.01); *G06F 12/0815* (2013.01)

(58) Field of Classification Search
None
See application file for complete search history.

(56) References Cited

U.S. PATENT DOCUMENTS

| 6,055,605 | A | 4/2000 | Sharma et al. |
| 6,516,393 | B1 * | 2/2003 | Fee et al. ..................... 711/150 |
| 6,976,131 | B2 * | 12/2005 | Pentkovski et al. .......... 711/146 |
| 2002/0169935 | A1 | 11/2002 | Krick et al. |
| 2003/0159003 | A1 * | 8/2003 | Gaskins et al. ............... 711/128 |
| 2005/0071573 | A1 * | 3/2005 | Dodson ............... G06F 12/0831 711/145 |

FOREIGN PATENT DOCUMENTS

| CN | 1508696 A | 6/2004 |
| JP | H06187239 A | 7/1994 |
| JP | 2000250812 A | 9/2000 |
| JP | 2001034533 A | 2/2001 |
| WO | WO 97/04392 A1 | 2/1997 |

OTHER PUBLICATIONS

European Patent Office, Invitation to Pay Additional Fees/Communication Relating to the Results of the Partial International Search for International Application No. PCT/US2005/030444, 4 pages, Feb. 9, 2006.

* cited by examiner

*Primary Examiner* — Eric S Cardwell
(74) *Attorney, Agent, or Firm* — Nicholson De Vos Webster & Elliott, LLP

(57) ABSTRACT

Preventing request conflicts within microprocessors and/or computer systems. More particularly, embodiments of the invention relate to a technique to manage request conflicts within a processor and/or computer system in which a number of accesses may be made to a particular cache or group of caches shared amongst a set of cores or processors or agents.

6 Claims, 5 Drawing Sheets

RESOLVING MULTI-CORE SHARED CACHE ACCESS CONFLICTS

CROSS-REFERENCE TO RELATED APPLICATIONS

This application is a continuation-in-part of U.S. patent application Ser. No. 10/937,973 filed on Sep. 9, 2004 now abandoned.

FIELD

Embodiments of the invention relate to microprocessors and microprocessor systems. More particularly, embodiments of the invention relate to resolving cache access conflicts within a processor or computer system in which a number of cores access the same cache or group of caches.

BACKGROUND

Prior art processors and computer systems may be limited in the number of accesses to a particular cache or group of caches that can be concurrently managed. One prior art technique used to ameliorate this limitation has been the use of an inclusive cache structure whose cache entries correspond to the cache entries of one or more processor core-specific caches, such as level 1 (L1) caches. In other words, prior art multi-core processors and/or multi-processor computer systems have attempted to reduce cache access traffic to core caches by simply directing some of the cache accesses to a shared inclusive cache structure, such as a last level cache (LLC), that contains all of the cache entries of the processor cores or agents to which the inclusive cache structure corresponds. In the case of a cache access from a core within a multi-core processor, however, the core will typically attempt to access data first from its own cache and then resort to the shared cache. The shared inclusive cache structure is sometimes referred to as a "snoop filter" because it shields core caches from excessive cache accesses, and therefore traffic, from other agents by providing the requested data to these agents from the inclusive cache instead of the core's cache.

The prior art technique of using a cache structure, such as an LLC, for servicing cache requests from various agents is helpful in allowing requesting agents to obtain the data they need without resorting to a cache of a processor core, for example, if the data is not exclusively owned or modified by a particular processor core. To the extent that an agent, such as a processor or processor core owns the cache line of its cache in a shared state that the requesting agent is trying to access, a cache structure, such as an LLC, can allow the requesting agent to obtain the data it is requesting rather than waiting for the owning agent to share the data.

However, conflicts can occur when using an LLC to service cache requests. FIG. 1, for example, illustrates three events occurring at substantially the same time: core 0 attempts to access a cache line in the LLC that is exclusively owned by core 1; shortly thereafter, the LLC performs a capacity eviction of the accessed line from the LLC; about this time, core 1 initiates a writeback of that cache line. In some cases, as part of the LLC's capacity eviction sequencing, a snoop may need to be done to core 1 (a "back invalidation") to preserve the LLC's inclusive property. Core 0 may retrieve erroneous data from the inclusive LLC if core 0's request is not properly reconciled with the writeback data from core 1 and, potentially, with data retained by core 1 after its writeback has taken place.

Fulfilling the request of core 0 requires resolution of a three-way conflict between core 0's request, the LLC capacity eviction's back invalidate to core 1, and core 1's writeback of updated data.

The prior art problem depicted in FIG. 1 is exacerbated as the number of processor cores or other agents increases in the system. For example, the conflicts depicted in FIG. 1 may double in a multi-core processor containing four cores instead of the two illustrated in FIG. 1. Similarly, as the number of processors increase in a computer system, so does the potential number of accesses to any particular core cache, thereby increasing the number of conflicts that can occur during an LLC eviction.

Cache conflicts, such as those depicted in FIG. 1, can have adverse effects on processor performance because requesting agents either wait for the LLC eviction and corresponding back invalidates to complete, or detect and recover from retrieving incorrect data as a result of the conflict. Accordingly, the number of agents that may access a particular cache structure can be limited in prior art processor and/or computer systems.

BRIEF DESCRIPTION OF THE DRAWINGS

Embodiments of the invention are illustrated by way of example and not limitation in the figures of the accompanying drawings, in which like references indicate similar elements and in which.

DETAILED DESCRIPTION

Embodiments of the invention relate to caching architectures within microprocessors and/or computer systems. More particularly, embodiments of the invention relate to a technique to manage cache access conflicts within a processor and/or computer system in which a number of accesses may be made to a particular cache or group of caches.

This disclosure describes various embodiments of the invention to address problems associated with prior art caching techniques in multi-processor and/or multi-core computer systems, including conflict resolution and avoidance when a number of requesting agents attempt to access the same line of cache. In at least one embodiment of the invention, an inclusive cache structure, such as a last level cache (LLC), is used in conjunction with a number of processors or processor cores having an associated cache, such as a level 1 (L1) cache. Inclusive cache structures, such as an LLC, include those that contain at least the same data as other caches to which the inclusive cache structure corresponds. By maintaining coherence between the inclusive cache structure and corresponding core and/or processor caches, accesses to the corresponding core/processor caches are serviced by the inclusive cache, thereby reducing traffic to the corresponding cores/processors and allowing the cores/processors.

Embodiments of the invention, in which an inclusive cache structure is used, can also reduce or even alleviate the number and/or types of conflicts that can occur when a number of processors and/or processor cores attempt to access the same line of cache within the inclusive cache structure. For example, at least one embodiment of the invention alleviates conflicts resulting from a cache request from a processor, in a multi-processor system and/or from a core, in a multi-core processor, to a line within an inclusive cache structure, such as an LLC, that is being evicted from the LLC as a result of a fill to the LLC to the same set, and a write back from a core which owns the line that corresponds to the line evicted from the LLC. Furthermore, at least one embodiment alleviates conflicts resulting from a cache request from a processor, in a multi-processor system, and/or from a core, in a multi-core processor, to a line within a shared inclusive cache, such as an LLC, that is being filled and the resulting eviction of the shared inclusive cache line. Other embodiments may resolve other conflicts resulting from multiple accesses to an evicted inclusive cache line from various requesting agents.

Figure 1:
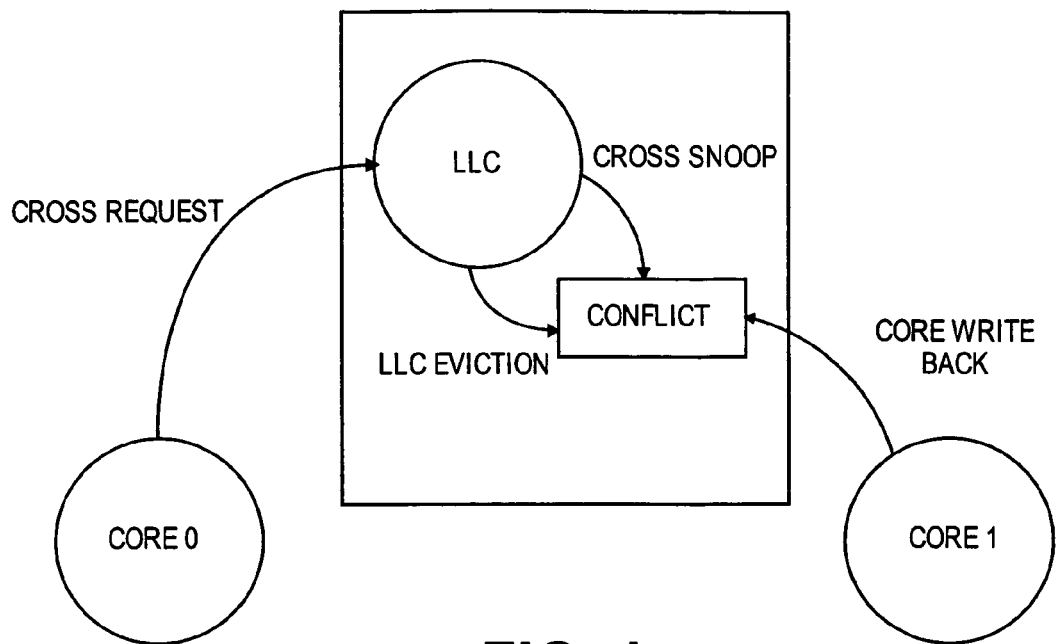
FIG. 1 illustrates a conflict between a number of access to the same cache line in a prior art processor or computer system.
Figure 2:
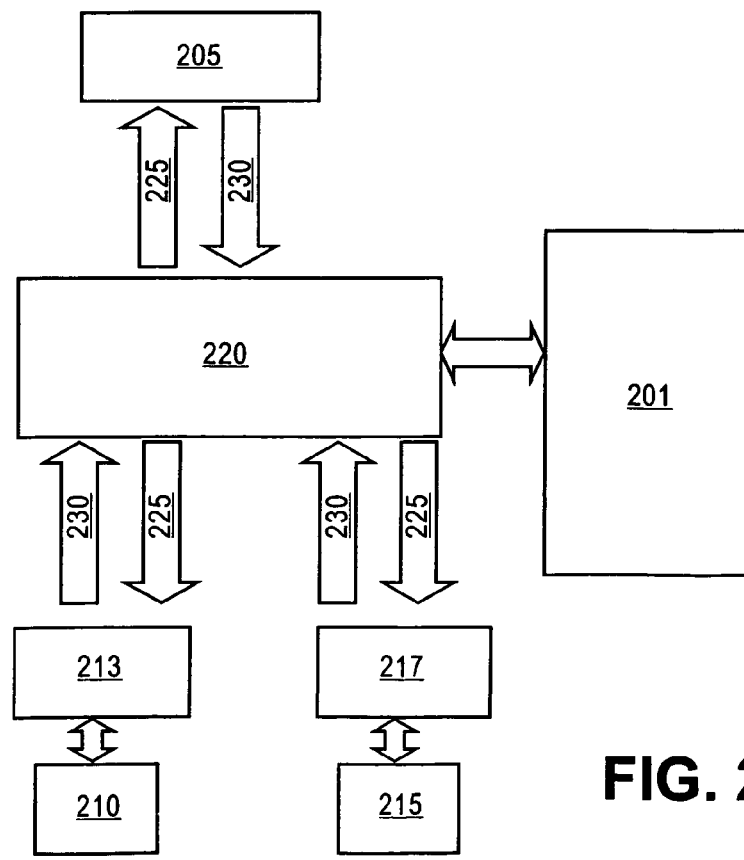
FIG. 2 illustrates a caching bridge architecture according to one embodiment of the invention.

FIG. 2 illustrates a caching bridge architecture, according to one embodiment of the invention, which resolves conflicts among a number of accesses to an evicted inclusive cache line. Specifically, the cache bridge architecture of FIG. 2 illustrates an LLC 201 that may be accessed by external agents via a computer system interconnect interface 205, such as a front-side bus interface or a point-to-point interface. Furthermore, the LLC may be accessed by core 0 (210) and/or core 1 (215) via core interconnect interfaces 213 and 217, respectively. The cache bridge scheduling and ordering (CBSO) logic 220 manages the accesses to the LLC from the external and core agents, in at least one embodiment of the invention, using internal and external request queues 225 and 230, respectively, which can be used to store command, address, and/or data corresponding to access to the LLC made by the external and/or core agents.

In at least one embodiment of the invention, the CBSO logic may be used to manage and resolve conflicts resulting from a number of transactions, including an LLC look-up, LLC cache eviction, LLC line fills, and cross snoop transactions.

An LLC look-up, typically involves read and read-for-ownership transactions from the cores accessing the LLC to read or gain ownership of a desired line of cache. If the LLC look-up results in a miss, the request may be allocated to the external request queue corresponding to the computer system interconnect interface. If the LLC look-up resulting in a hit, however, and the corresponding LLC line is not exclusively owned by another core or processor then the request can be completed and data returned to the requesting core. Accesses to a particular core from a requesting agent may be reduced by maintaining a record of whether another core has exclusive ownership, shared ownership, or no ownership of a requested line of the LLC. The record may be a number of sets of bits in a register corresponding to the number of cores in a processor, each set of bits indicating the type of ownership of the requested LLC line, if any, for the core/processor to which it corresponds. However, the record may be implemented in other ways.

An LLC eviction, may require a snoop ("back invalidate") to one or more cores or processors to coherently evict a cache line from the cache hierarchy. If the back invalidate is sent to multiple cores or processors, there may be situations in which one or more cores/processors do not receive the back invalidate. Accordingly, conflicts with this back invalidate operation may result.

Fills to the LLC typically result from sequencing in response to a core or processor request missing the LLC. New data and coherence state can be obtained from a memory agent which can be an on-die memory controller or off-die memory controller. This line is then filled in to the LLC after returning the new data and coherence state to the requesting core. If the cache set into which the fill is occurring is full, an eviction is caused from LLC, this eviction is sometimes referred to as a "capacity eviction" because it is caused due to the capacity limitations in the LLC. Fills may result from core requests within a multi-core processors, depending on the core to which the LLC line to be filled corresponds. Furthermore, in one embodiment of the invention, the filled line of the LLC may be in a number of ownership states, such as shared, exclusive or modified. In some multi-core processors the LLC coherency states may include extended states to indicate the state of the cache line to the cores versus the state of the cache line to agents external to the multi-core processor. For example, in some embodiments, LLC coherency state ES indicates to agents external to the multi-core processor that the filled LLC line is exclusively owned by the multi-core processor, while permitting several individual cores within the multi-core processor to share the filled LLC line. Similarly, the MS coherency state may indicate to external agents that the LLC line is modified while indicating to the cores that the LLC line may be shared.

Cross snoop transactions to the LLC typically result when an ownership request from a core or other agent determines that the LLC line is owned by another core or agent sharing the LLC with the request originator. In this case, the core/agent requesting ownership will perform a snoop to the core/agent ("cross snoop") owning the line, which can result in the line state changing from "exclusive" to "invalid" or "shared", depending on the particular coherency protocol being used.

If any of the above transactions (back invalidates, cross snoops, reads, and evictions) occur substantially simultaneously, conflicts may arise that have adverse effects on processor and/or system performance. Accordingly, one embodiment of the invention prevents, or at least manages, conflicts between two of these transactions ("two-way conflict" management). Furthermore, another embodiment of the invention prevents, or at least manages, conflicts between three of these transactions ("three-way conflict" management).

In one embodiment of the invention, the CBSO logic manages, or prevents, conflicts resulting from a write back to the LLC from a core or external bus agent to a line being evicted from the LLC. In the case that a writeback is occurring to an LLC line that is being evicted, a conflict can occur between the back invalidate resulting from the eviction and the writeback operation if the back invalidate does not correctly deal with the writeback operation. The conflict can result in incorrect data being written to the line evicted from the LLC.

In another embodiment, the CBSO logic manages, or prevents, conflicts resulting from a snoop to an LLC line from an agent on the computer system interface of FIG. 2, a writeback to the LLC line from a core, and an LLC back invalidate from an LLC capacity eviction of the line. In the case that an external snoop occurs to the same LLC line for which a back invalidate and writeback is occurring, the external agent could retrieve incorrect data, because data delivered to the snoop could be supplied with either the writeback from a core, or data from a core resulting from the back invalidate.

Figure 3:
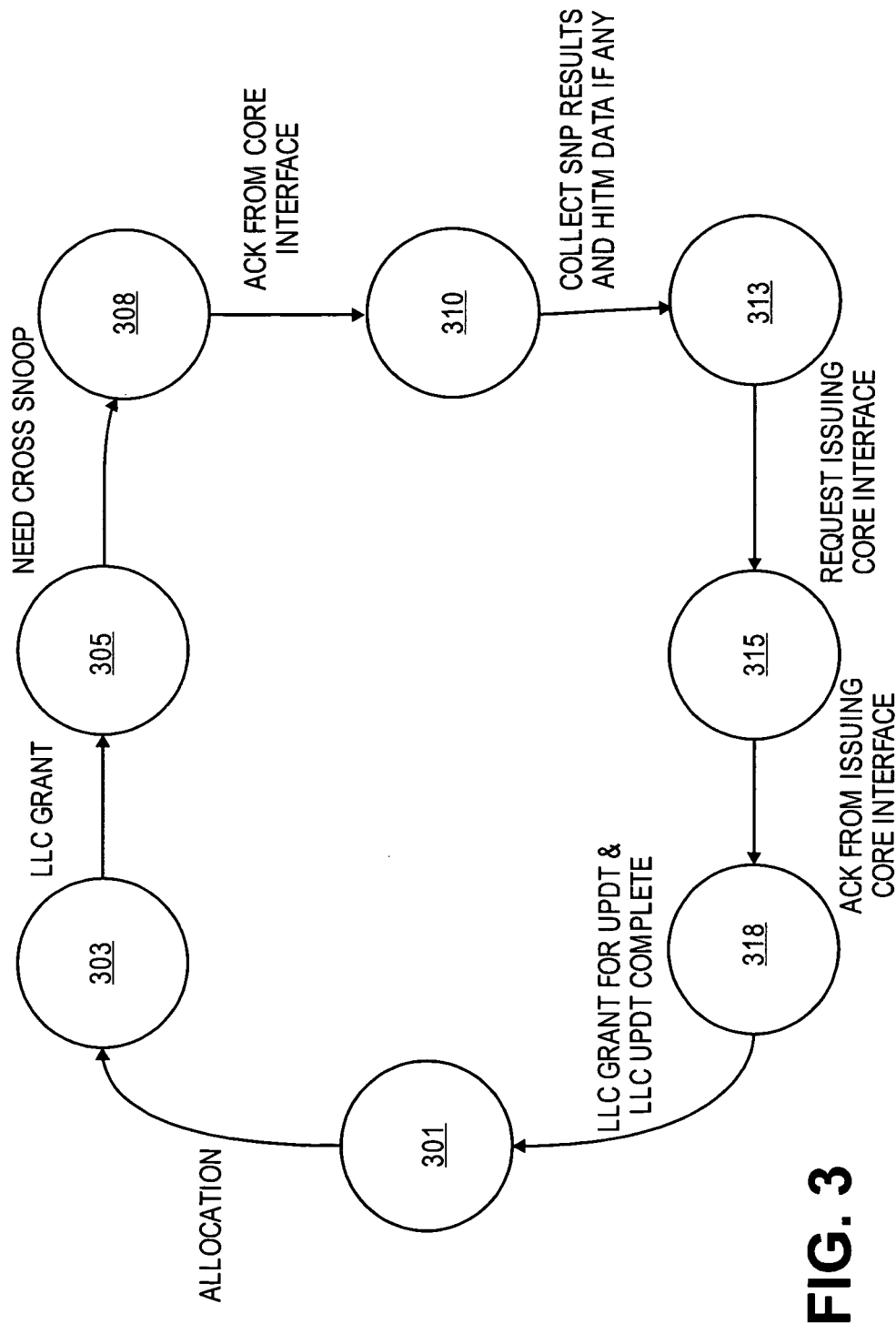
FIG. 3 illustrates a cross snoop state machine for a processor used in conjunction with one embodiment of the invention.

FIG. 3 is a state diagram illustrating operations associated with a typical cross snoop transaction, according to one embodiment of the invention. From the idle state 301, a read transaction to the LLC, such as from a core within a multi-core processor, causes the state diagram to transition to pending state 303 until the line can be granted to the requesting agent, at which time the state changes to the look-up state 305. During the look-up state, the LLC returns the coherency state of the requested line to the requesting core, which can indicate that one or more other cores currently own the requested line. In the case that one or more other cores own the requested line in the LLC, a cross snoop to other core(s) is initiated at state 310. A core receiving the cross snoop may supply data in response. After all cores receiving the cross snoop indicate that they have completed their snoop sequencing, the cross snoop is complete at state 313 and LLC data, possibly updated with data supplied during the cross snoop, is delivered to the requesting core at state 315. The LLC may be updated with the cross snoop data at state 320 and returned to the idle state.

During states 308 to 320, the cross snoop can experience conflicts with operations resulting from an eviction of the LLC to which the request corresponds. One operation resulting from an LLC eviction that can conflict with the cross snoop is a writeback from a core to which the evicted LLC line corresponds. Another conflict can occur if a read request causes a cross snoop to a core from which a writeback is to be made to a line evicted in the LLC. If the writeback occurs before the cross snoop, the wrong data may be returned to the requesting core or agent. Furthermore, a conflict can occur in the case where an external snoop is made to the LLC at approximately the same time involving the same LLC address as an eviction, a cross snoop, and a writeback.

In one embodiment of the invention, the above-mentioned conflicts can be avoided by copying the coherence information of the line to which a core request is made in the LLC to a temporary storage location and invalidating the corresponding LLC line, such that the line will appear invalid to subsequent requests, thereby avoiding an unplanned eviction of the LLC line that may result in back invalidates that conflict with a cross snoop resulting from the request. By storing the LLC line coherency information after receiving a read request, the resulting cross snoop can be guaranteed to deliver correct data to the requester. Furthermore, by atomically invalidating the LLC line upon a core request that requires a cross snoop, eviction of the LLC is avoided by subsequent transactions, and therefore, no conflicting LLC eviction back invalidates will occur to the LLC line.

After delivering the requested data to the requestor, the data and coherency information may be filled to the LLC to preserve its inclusion property. In an alternative embodiment, a mechanism may be used to cancel any requests that may prevent an access to the LLC from resulting in a cross snoop. This condition may arise, for example, if a writeback to an LLC line occurs after a read to the LLC line.

Figure 4:
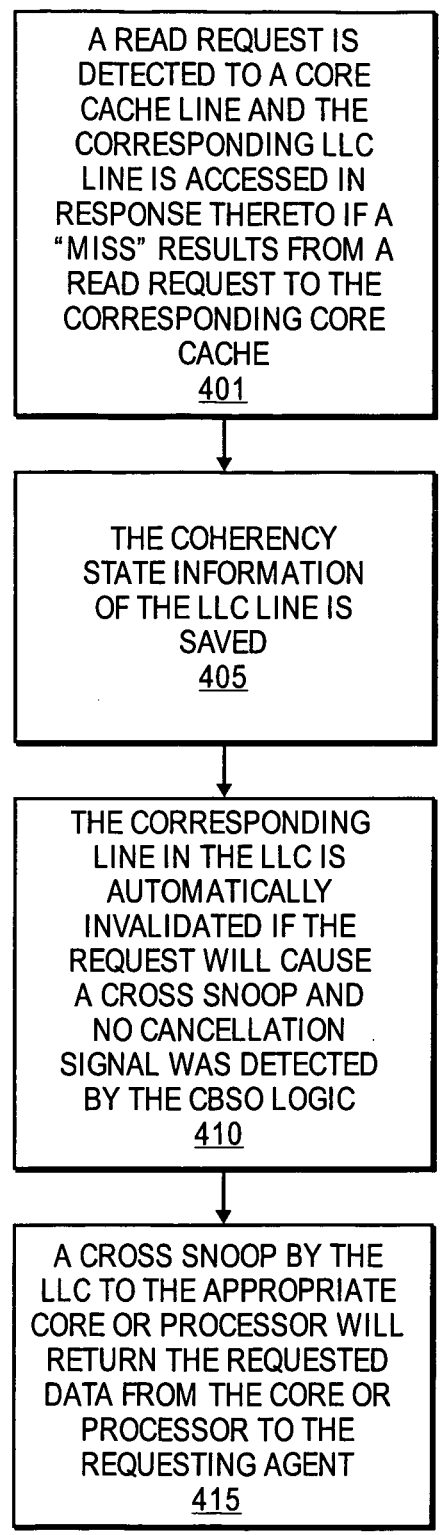
FIG. 4 is a flow diagram illustrating operations used in conjunction with at least one embodiment of the invention.

FIG. 4 is a flow diagram illustrating operations involved in one embodiment of the invention. At operation 401, a read request is detected to a core cache line and the corresponding LLC line is accessed in response thereto if a "miss" results from a read request to the corresponding core cache. At operation 405, the coherency state information of the LLC line is saved. In one embodiment, the coherency state data is saved to a register within the CBSO logic of FIG. 2. In other embodiments, the coherency information may be saved to memory or some other storage structure. After the coherency state information is saved, the corresponding line in the LLC is atomically invalidated at operation 410, such that subsequent transactions will see the LLC line as invalidated, if the request will cause a cross snoop and no cancellation signal was detected by the CBSO logic. A cross snoop by the LLC to the appropriate core or processor will return the requested data from the core or processor to the requesting agent at operation 415.

In one embodiment of the invention, at least some of the operations illustrated in FIG. 4 are performed by the CBSO logic of FIG. 2. In other embodiments, the operations may be performed by other means, such as software, or some other logic within the caching bridge architecture of FIG. 2.

Figure 5:
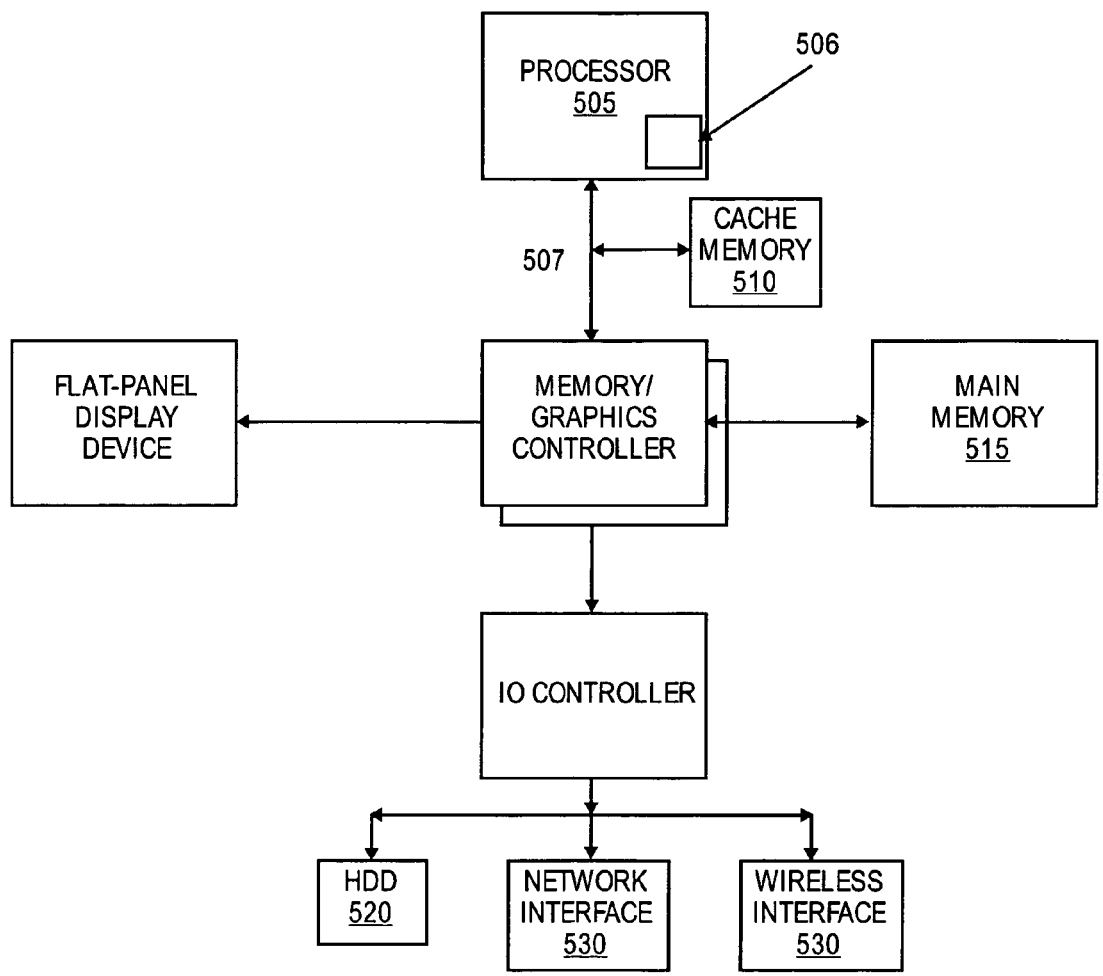
FIG. 5 illustrates a front-side bus computer system in which at least one embodiment of the invention may be used.

FIG. 5 illustrates a front-side-bus (FSB) computer system in which one embodiment of the invention may be used. A processor 505 accesses data from a level one (L1) cache memory 510 and main memory 515. In other embodiments of the invention, the cache memory may be a level two (L2) cache or other memory within a computer system memory hierarchy. Furthermore, in some embodiments, the computer system of FIG. 5 may contain both a L1 cache and an L2 cache, which comprise an inclusive cache hierarchy in which coherency data is shared between the L1 and L2 caches.

Illustrated within the processor of FIG. 5 is one embodiment of the invention 506. In some embodiments, the processor of FIG. 5 may be a multi-core processor.

The main memory may be implemented in various memory sources, such as dynamic random-access memory (DRAM), a hard disk drive (HDD) 520, or a memory source located remotely from the computer system via network interface 530 containing various storage devices and technologies. The cache memory may be located either within the processor or in close proximity to the processor, such as on the processor's local bus 507. Furthermore, the cache memory may contain relatively fast memory cells, such as a six-transistor (6T) cell, or other memory cell of approximately equal or faster access speed.

The computer system of FIG. 5 may be a point-to-point (PtP) network of bus agents, such as microprocessors, that communicate via bus signals dedicated to each agent on the PtP network. Within, or at least associated with, each bus agent is at least one embodiment of invention 506, such that store operations can be facilitated in an expeditious manner between the bus agents.

Figure 6:
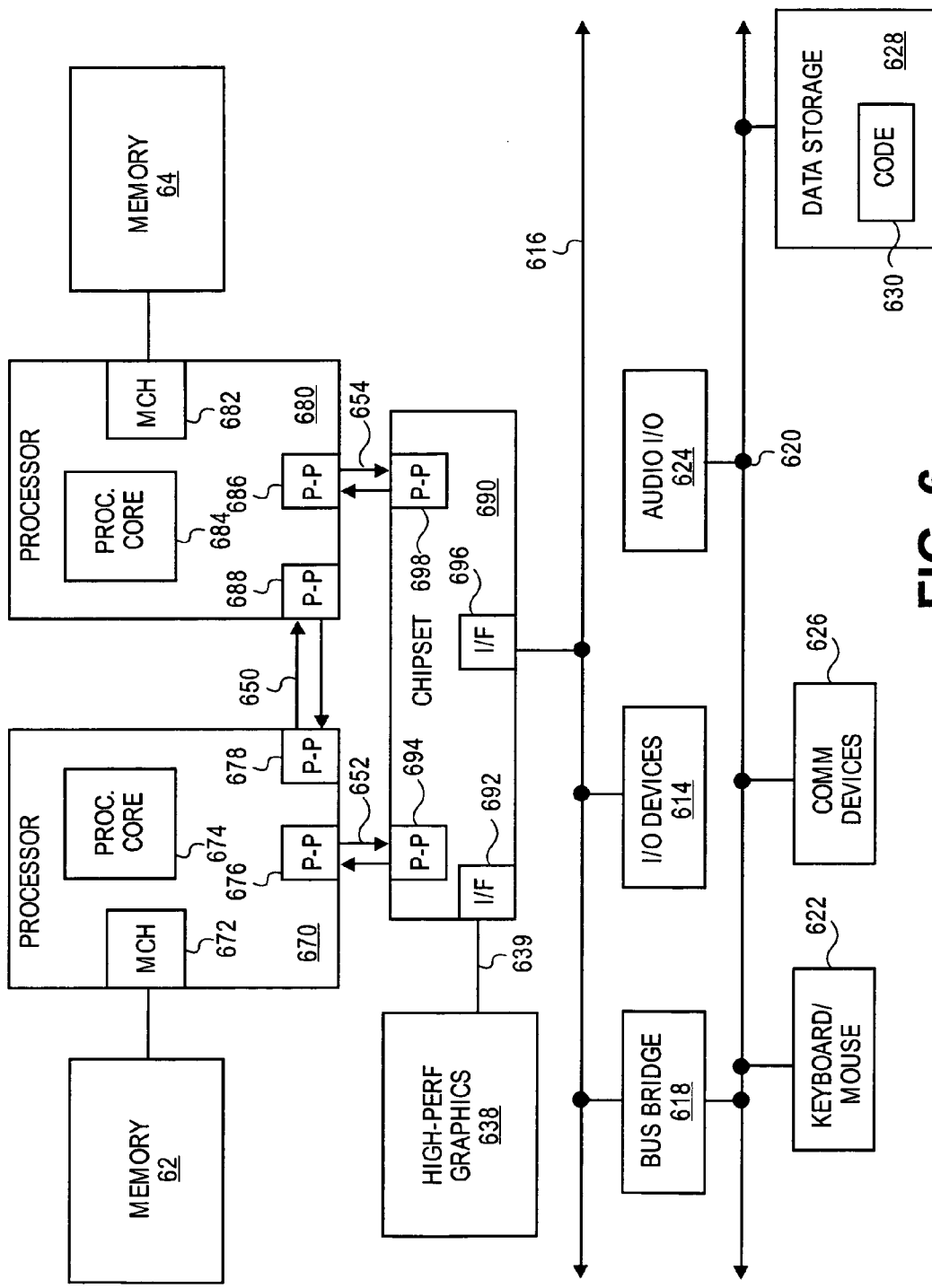
FIG. 6 illustrates a point-to-point computer system in which at least one embodiment of the invention may be used.

FIG. 6 illustrates a computer system that is arranged in a point-to-point (PtP) configuration. In particular, FIG. 6 shows a system where processors, memory, and input/output devices are interconnected by a number of point-to-point interfaces.

The system of FIG. 6 may also include several processors, of which only two, processors 670, 680 are shown for clarity. Processors 670, 680 may each include a local memory controller hub (MCH) 672, 682 to connect with memory 62, 64. Processors 670, 680 may exchange data via a point-to-point (PtP) interface 650 using PtP interface circuits 678, 688. Processors 670, 680 may each exchange data with a chipset 690 via individual PtP interfaces 652, 654 using point to point interface circuits 676, 694, 686, 698. Chipset 690 may also exchange data with a high-performance graphics circuit 638 via a high-performance graphics interface 639.

At least one embodiment of the invention may be located within the processors 670 and 680. Other embodiments of the invention, however, may exist in other circuits, logic units, or devices within the system of FIG. 6. Furthermore, other embodiments of the invention may be distributed throughout several circuits, logic units, or devices illustrated in FIG. 6.

Embodiments of the invention described herein may be implemented with circuits using complementary metal-oxide-semiconductor devices, or "hardware", or using a set of instructions stored in a medium that when executed by a machine, such as a processor, perform operations associated with embodiments of the invention, or "software". Alternatively, embodiments of the invention may be implemented using a combination of hardware and software.

While the invention has been described with reference to illustrative embodiments, this description is not intended to be construed in a limiting sense. Various modifications of the illustrative embodiments, as well as other embodiments, which are apparent to persons skilled in the art to which the invention pertains are deemed to lie within the spirit and scope of the invention.

What is claimed is:

1. An integrated circuit comprising:
   a plurality of processing cores coupled to a shared inclusive cache to store information contained within each of a plurality of local caches corresponding to the plurality of processing cores; and
   circuitry to save, in a storage external to the shared inclusive cache, coherency state information of a cache line stored in the shared inclusive cache on detection of a miss for a read request from a requestor to the cache line in a local cache of one of the plurality of processing cores that is to cause an access to the cache line in the shared inclusive cache, invalidate the cache line stored in the shared inclusive cache when the read request is to cause a cross snoop, and fill the cache line and refill, from the storage, the coherency state information of the cache line into the shared inclusive cache after the cache line is delivered to the requestor.

2. The integrated circuit of claim 1, wherein a cache line fill to the cache line is to cause an eviction of the cache line from the shared inclusive cache.

3. The integrated circuit of claim 1, wherein the coherency state information includes at least one bit to indicate that the cache line is atomically invalidated in the shared inclusive cache as a result of the access.

4. The integrated circuit of claim 1, wherein the storage is a register, and the circuitry is to save the coherency state information of the cache line stored in the shared inclusive cache into the register within the circuitry.

5. The integrated circuit of claim 1, wherein the circuitry is to invalidate the cache line stored in the shared inclusive cache when the read request is to cause a cross snoop and no cancellation signal is detected by the circuitry.

6. The integrated circuit of claim 1, wherein the shared inclusive cache is a last level cache (LLC).

* * * * *